US012579952B2

(12) United States Patent
Qin

(10) Patent No.: US 12,579,952 B2
(45) Date of Patent: Mar. 17, 2026

(54) DISPLAY PANEL AND DRIVING METHOD OF DISPLAY PANEL

(71) Applicant: TCL China Star Optoelectronics Technology Co., Ltd., Shenzhen (CN)

(72) Inventor: Qiqi Qin, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 204 days.

(21) Appl. No.: 18/384,907

(22) Filed: Oct. 30, 2023

(65) Prior Publication Data

US 2025/0046264 A1 Feb. 6, 2025

(30) Foreign Application Priority Data

Aug. 2, 2023 (CN) ........................ 202310970550.5

(51) Int. Cl.
*G09G 3/36* (2006.01)

(52) U.S. Cl.
CPC ....... *G09G 3/36* (2013.01); *G09G 2320/0233* (2013.01); *G09G 2320/0257* (2013.01); *G09G 2320/0626* (2013.01); *G09G 2360/16* (2013.01)

(58) Field of Classification Search
CPC ............. G09G 3/36; G09G 2320/0233; G09G 2320/0257; G09G 2320/0626;
(Continued)

(56) References Cited

U.S. PATENT DOCUMENTS 11,645,991 B2 5/2023 Chen
2008/0309601 A1* 12/2008 Furukoshi ........... G09G 3/3677 345/89
(Continued)

FOREIGN PATENT DOCUMENTS

CN 109410850 3/2019
CN 109410863 3/2019
(Continued)

OTHER PUBLICATIONS

Notification of Office Action and Search Report Dated Aug. 26, 2025 From The State Intellectual Paroperty Office of the People's Republic of China Re. Application No. 202310970550.5 and Its Translation Into English. (18 Pages).

*Primary Examiner* — Antonio Xavier

(57) ABSTRACT

A display panel and its driving method are provided. When a grayscale difference is less than a first preset grayscale threshold, a first driving voltage is determined to drive the display panel for displaying a current frame to be displayed. When the grayscale difference is greater than or equal to the first preset grayscale threshold and less than or equal to a second preset grayscale threshold, a second driving voltage is determined to drive display. When the grayscale difference is greater than the second preset grayscale threshold, an overdrive lookup table is invoked to determine a third driving voltage for driving display. The second driving voltage is greater than the first driving voltage and less than the third driving voltage. The second preset grayscale threshold is greater than the first grayscale threshold. This approach reduces brightness differences between different positions and prevents the occurrence of momentary watermarks or mura.

6 Claims, 2 Drawing Sheets

(58) Field of Classification Search
CPC ............. G09G 2360/16; G09G 3/3648; G09G 3/3696; G09G 3/20; G09G 2290/00; G09G 2320/0252
See application file for complete search history.

(56) References Cited

U.S. PATENT DOCUMENTS

| | | | | |
|---|---|---|---|---|
| 2016/0180761 | A1* | 6/2016 | Sasaki | G09G 3/36 345/88 |
| 2020/0111405 | A1* | 4/2020 | Kim | G09G 3/2092 |
| 2021/0043154 | A1* | 2/2021 | Li | G09G 3/3607 |

FOREIGN PATENT DOCUMENTS

| | | |
|---|---|---|
| CN | 111554244 | 8/2020 |
| CN | 115713920 | 2/2023 |

* cited by examiner

DISPLAY PANEL AND DRIVING METHOD OF DISPLAY PANEL

RELATED APPLICATION

This application claims the benefit of priority of China Patent Application No. 202310970550.5 filed on Aug. 2, 2023, the contents of which are incorporated by reference as if fully set forth herein in their entirety.

FIELD OF DISCLOSURE

The present application relates to a field of display technology, and specifically to a display panel and a driving method of the display panel.

DESCRIPTION OF RELATED ART

With the development of display technology, display panels have been widely used in people's lives, such as the screens of mobile phones and computers. As life progresses and technology advances, people's demands for the display performance of these panels are increasing. In the process of driving a liquid crystal display panel, due to the limited response speed of liquid crystals, it is difficult to achieve the desired deflection angle within one frame's time, which can result in the display brightness not reaching the expected level, and dynamic images showing motion blur. To overcome these shortcomings, existing technologies have introduced a technique known as over drive (OD), which is an important technology for improving the dynamic response quality of liquid crystal panels. The principle behind OD is that when the signal changes from A to B, a signal C of one frame is inserted in between. the signal voltage difference between A and C is used to over drive the liquid crystal molecules to rotate rapidly. When the frame time of the signal C ends, the liquid crystal molecules rotate exactly to the desired angle for the signal B. In order to implement OD technology, existing techniques typically store an Over Drive lookup table (OD table) in the liquid crystal display driving system. The horizontal axis of this lookup table represents the grayscale of the (n-1)th frame, and the vertical axis represents the grayscale of the n-th frame. The data obtained by looking up the grayscale values of the (n-1)th frame and the n-th frame in the OD table is the actual output grayscale during overdriving. The system will use the grayscale values of A and B to look up the corresponding value of C in the OD table. For example, when the (n-1)th frame corresponds to a grayscale of 48 and the n-th frame corresponds to a grayscale of 96, by referring to the table, the actual output grayscale during overdriving is 116.

However, during the transition of dynamic images, variations in grayscale at different positions can trigger the use of different overdrive lookup tables, leading to noticeable differences in brightness and darkness in the display. This results in the issue of momentary watermarks, or mura (uneven display, with noticeable differences in brightness and darkness at different positions).

SUMMARY OF INVENTION

The embodiments of the present application provide a display panel and a driving method of the display panel that can address the issue of noticeable differences in brightness and darkness in the display, as well as the occurrence of momentary watermarks or mura (uneven display) due to variations in grayscale at different positions during the transition of dynamic images triggering the use of different overdrive lookup tables.

The present application provides a display panel, including:

a storage module that stores an overdrive lookup table;

an acquisition module for obtaining a first grayscale of a current frame to be displayed and a second grayscale of a previous frame of the current frame to be displayed, for at least a portion of positions of the display panel;

a determination module for determining whether to call the overdrive lookup table to determine a driving voltage according to a grayscale difference between the first grayscale and the second grayscale; and a control module for determining the driving voltage based on a result from the determination module to drive the display panel to display the current frame to be displayed, wherein the step of "determining the driving voltage based on the result from the determination module to drive the display panel to display the current frame to be displayed" includes:

when the grayscale difference is less than a first preset grayscale threshold, driving the display panel to display the current frame to be displayed with a first driving voltage;

when the grayscale difference is greater than or equal to the first preset grayscale threshold and less than or equal to a second preset grayscale threshold, driving the display panel to display the current frame to be displayed with a second driving voltage; and when the grayscale difference is greater than the second preset grayscale threshold, calling the overdrive lookup table to determine a third driving voltage and driving the display panel to display the current frame to be displayed with the third driving voltage, wherein the second driving voltage is greater than the first driving voltage and less than the third driving voltage, and the second preset grayscale threshold is greater than the first grayscale threshold.

Optionally, in some embodiments of the present application, the first driving voltage is a driving voltage independent of calling the overdrive lookup table, and the third driving voltage is a driving voltage that is obtained from calling the overdrive lookup table.

Optionally, in some embodiments of the present application, voltage values in the overdrive lookup table are initial voltage values, and the second driving voltage is a calibrated voltage value obtained by multiplying the initial voltage value from the overdrive voltage lookup table by K, wherein K is greater than 0 and less than 1.

Optionally, in some embodiments of the present application, the first preset grayscale threshold is any integer from 3 to 8, and the second preset grayscale threshold is any integer from 4 to 16.

The present application further provides a driving method of a display panel, including the following steps:

obtaining a first grayscale of a current frame to be displayed and a second grayscale of a previous frame of the current frame to be displayed, for at least a portion of positions of the display panel;

providing an overdrive lookup table; and determining whether to call the overdrive lookup table to determine a driving voltage according to a grayscale difference between the first grayscale and the second grayscale, in order to drive the display panel to display the current frame to be displayed, wherein the step of determining whether to call the overdrive lookup table to determine the driving voltage according to the grayscale difference between the first grayscale and the second grayscale in order to drive the display panel to display the current frame to be displayed includes:

when the grayscale difference is less than a first preset grayscale threshold, driving the display panel to display the current frame to be displayed with a first driving voltage;

when the grayscale difference is greater than or equal to the first preset grayscale threshold and is less than or equal to a second preset grayscale threshold, driving the display panel to display the current frame to be displayed with a second driving voltage; and when the grayscale difference is greater than the second preset grayscale threshold, calling the overdrive lookup table to determine a third driving voltage and driving the display panel to display the current frame to be displayed with the third driving voltage, wherein the second driving voltage is greater than the first driving voltage and less than the third driving voltage, and the second preset grayscale threshold is greater than the first grayscale threshold.

Optionally, in some embodiments of the present application, the first driving voltage is a driving voltage independent of calling the overdrive lookup table, and the third driving voltage is a driving voltage that is obtained from calling the overdrive lookup table.

Optionally, in some embodiments of the present application, voltage values in the overdrive lookup table are initial voltage values, and the second driving voltage is a calibrated voltage value obtained by multiplying the initial voltage value from the overdrive voltage lookup table by K, wherein K is greater than 0 and less than 1.

Optionally, in some embodiments of the present application, the first preset grayscale threshold is any integer from 3 to 8.

Optionally, in some embodiments of the present application, the second preset grayscale threshold is any integer from 4 to 16.

Optionally, in some embodiments of the present application, K is any one of 0.1, 0.2, 0.3, 0.4, 0.5, 0.6, 0.7, 0.8, or 0.9.

The present application provides a display panel and a driving method of the display panel. The display panel includes: a storage module that stores an overdrive lookup table; an acquisition module for obtaining a first grayscale of a current frame to be displayed and a second grayscale of a previous frame of the current frame to be displayed, for at least a portion of positions of the display panel; a determination module for determining whether to call the overdrive lookup table to determine a driving voltage according to a grayscale difference between the first grayscale and the second grayscale; and a control module for determining the driving voltage based on a result from the determination module to drive the display panel to display the current frame to be displayed, wherein the step of "determining the driving voltage based on the result from the determination module to drive the display panel to display the current frame to be displayed" includes: when the grayscale difference is less than a first preset grayscale threshold, driving the display panel to display the current frame to be displayed with a first driving voltage; when the grayscale difference is greater than or equal to the first preset grayscale threshold and less than or equal to a second preset grayscale threshold, driving the display panel to display the current frame to be displayed with a second driving voltage; and when the grayscale difference is greater than the second preset grayscale threshold, calling the overdrive lookup table to determine a third driving voltage and driving the display panel to display the current frame to be displayed with the third driving voltage, wherein the second driving voltage is greater than the first driving voltage and less than the third driving voltage, and the second preset grayscale threshold is greater than the first grayscale threshold. In this application, by setting the first preset grayscale threshold and the second preset grayscale threshold, when the grayscale difference is greater than or equal to the first preset grayscale threshold and less than or equal to the second preset grayscale threshold, the second driving voltage is determined to drive the display panel to display the current frame to be displayed. During dynamic frame transitions, varying grayscale differences at different positions trigger the use of different overdrive lookup tables to determine the second driving voltage, in order to drive the display panel to display the current frame to be displayed. The second driving voltage is greater than the first driving voltage and less than the third driving voltage. The second driving voltage serves as an intermediate value between the first and third driving voltages. This reduction in voltage discrepancies or grayscale differences between different positions decreases variations in brightness across the display when calling the overdrive lookup table, thus preventing the occurrence of momentary watermarks or mura (uneven display).

BRIEF DESCRIPTION OF DRAWINGS

In order to more clearly illustrate the technical solutions in the embodiments of the present application, the drawings needed to be used in the description of the embodiments are briefly introduced below. Obviously, the drawings in the following description are only some embodiments of the present application. For those skilled in the art, other drawings can also be obtained based on these drawings without creative efforts.

DETAILED DESCRIPTION OF EMBODIMENTS

Figure 1:
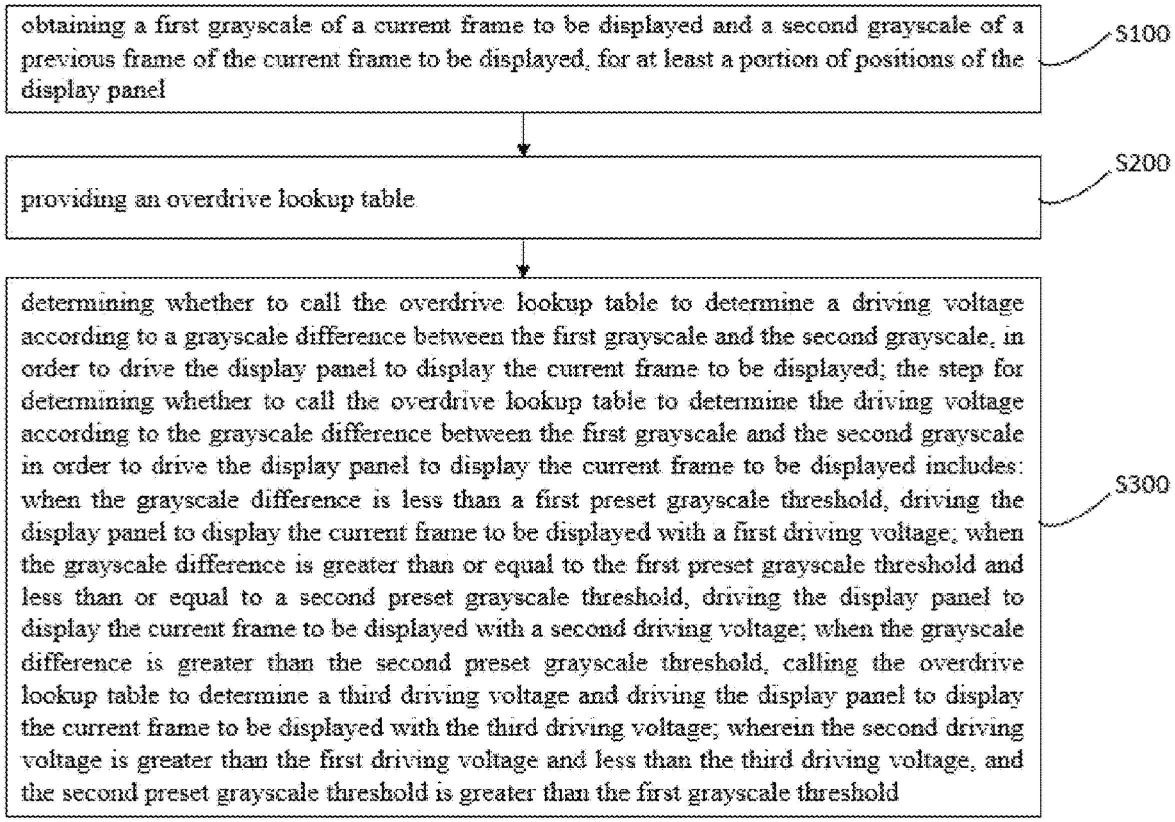
FIG. 1 is a schematic diagram illustrating steps in a driving method of a display panel according to a first embodiment of the present application.

Below, in conjunction with the accompanying drawings, the technical solutions in the embodiments of the present application are described clearly and comprehensively. It is evident that the described embodiments are only a part of the embodiments of this application, not the entirety. Based on the embodiments disclosed in this application, all other embodiments that skilled persons in the art can obtain without engaging in creative effort fall within the scope of protection of this application. Furthermore, it should be understood that the specific embodiments described here are intended for illustration and explanation of this application and are not meant to restrict this application. In this application, unless otherwise specified, directional terms like "up" and "down" typically refer to the upper and lower positions in the actual usage or operational state of the device, as depicted in the accompanying drawings, while "inside" and "outside" are in reference to the outline of the device.

The present application provides a display panel, including: a storage module that stores an overdrive lookup table; an acquisition module for obtaining a first grayscale of a current frame to be displayed and a second grayscale of a previous frame of the current frame to be displayed, for at least a portion of positions of the display panel; a determination module for determining whether to call (invoke) the overdrive lookup table to determine a driving voltage according to a grayscale difference between the first grayscale and the second grayscale; and a control module for determining the driving voltage based on a result from the determination module to drive the display panel to display the current frame to be displayed. The step of "determining the driving voltage based on the result from the determination module to drive the display panel to display the current frame to be displayed" includes: when the grayscale difference is less than a first preset grayscale threshold, driving the display panel to display the current frame to be displayed with a first driving voltage; when the grayscale difference is greater than or equal to the first preset grayscale threshold and less than or equal to a second preset grayscale threshold, driving the display panel to display the current frame to be displayed with a second driving voltage; when the grayscale difference is greater than the second preset grayscale threshold, calling the overdrive lookup table to determine a third driving voltage and driving the display panel to display the current frame to be displayed with the third driving voltage. In this context, the second driving voltage is greater than the first driving voltage, and less than the third driving voltage. The second preset grayscale threshold is greater than the first grayscale threshold.

The present application further provides a driving method that includes the aforementioned display panel. Detailed explanations are provided below. It should be noted that the order of description in the following embodiments does not imply a preferred order of implementation.

First Embodiment

Figure 2:
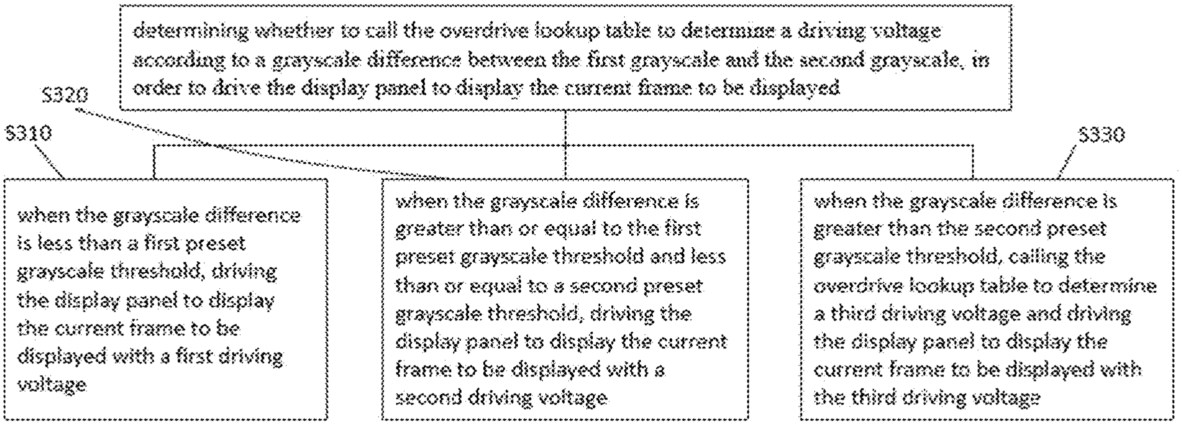
FIG. 2 is a breakdown schematic diagram of the last step in FIG. 1 of the embodiment.

Please refer to FIGS. 1 and 2. FIG. 1 is a schematic diagram of steps of a driving method of a display panel according to the first embodiment of the present application. FIG. 2 is a breakdown schematic diagram of the last step S300 in FIG. 1 of the present embodiment.

As shown in FIG. 1, the present application provides a driving method of a display panel, which includes steps S100, S200, and S300. The step numbering is for the purpose of explaining the spirit of the invention and does not imply a specific order of steps.

Step S100: obtaining a first grayscale of a current frame to be displayed and a second grayscale of a previous frame of the current frame to be displayed, for at least a portion of positions of the display panel.

Specifically, obtaining a first grayscale L1 of a current frame to be displayed for at least a portion of positions of the display panel, as well as a second grayscale L2 of a previous frame of the current frame to be displayed.

Specifically, the current frame to be displayed and the previous frame of the current frame to be displayed are images of two adjacent display frames.

Specifically, when the grayscale or brightness at different positions on the display panel is not the same, the first grayscale L1 and the second grayscale L2 can be the grayscale values of two consecutive frames at the same position on the display panel.

Step S200: providing an overdrive lookup table.

Specifically, the overdrive lookup table is an OD table. The overdrive lookup table is as introduced in the related art and is not described in detail here.

Step S300: determining whether to call the overdrive lookup table to determine a driving voltage according to a grayscale difference between the first grayscale and the second grayscale, in order to drive the display panel to display the current frame to be displayed. In the step for determining whether to call the overdrive lookup table to determine the driving voltage according to the grayscale difference between the first grayscale and the second grayscale, in order to drive the display panel to display the current frame to be displayed, the step includes: when the grayscale difference is less than a first preset grayscale threshold, driving the display panel to display the current frame to be displayed with a first driving voltage; when the grayscale difference is greater than or equal to the first preset grayscale threshold and less than or equal to a second preset grayscale threshold, driving the display panel to display the current frame to be displayed with a second driving voltage; when the grayscale difference is greater than the second preset grayscale threshold, calling the overdrive lookup table to determine a third driving voltage and driving the display panel to display the current frame to be displayed with the third driving voltage. In this context, the second driving voltage is greater than the first driving voltage and less than the third driving voltage, and the second preset grayscale threshold is greater than the first grayscale threshold.

Specifically, in the step for determining whether to call the overdrive lookup table to determine a driving voltage according to a grayscale difference ΔL between the first grayscale L1 and the second grayscale L2, in order to drive the display panel to display the current frame to be displayed, the step includes the following. S310: When the grayscale difference ΔL is less than a first preset grayscale threshold Gth1, driving the display panel to display the current frame to be displayed with a first driving voltage V1. S320: When the grayscale difference ΔL is greater than or equal to the first preset grayscale threshold Gth1 and is less than or equal to a second preset grayscale threshold Gth2, driving the display panel to display the current frame to be displayed with a second driving voltage V2. S330: When the grayscale difference ΔL is greater than the second preset grayscale threshold Gth2, calling the overdrive lookup table to determine a third driving voltage V3 and driving the display panel to display the current frame to be displayed with the third driving voltage V3. In this context, the second driving voltage V2 is greater than the first driving voltage V1 and less than the third driving voltage V3, and the second preset grayscale threshold Gth2 is greater than the first grayscale threshold Gth1. Specifically, as described above, the step of determining whether to call the overdrive lookup table to determine the driving voltage according to the grayscale difference ΔL between the first grayscale L1 and the second grayscale L2, in order to drive the display panel to display the current frame to be displayed, include: S310, S320, and S330. The display panel selects one of S310, S320, or S330 to display the current frame to be displayed.

Specifically, the grayscale difference ΔL is the absolute value of the difference between the first grayscale L1 and the second grayscale L2.

In this embodiment of the application, the first preset grayscale threshold Gth1 and the second preset grayscale threshold Gth2 are set. When the grayscale difference ΔL between two consecutive frames of the display panel, or the grayscale difference ΔL between two consecutive frames at a specific position in the display panel, is greater than or equal to the first preset grayscale threshold Gth1 and is less than or equal to the second preset grayscale threshold Gth2, the second driving voltage V2 is determined to drive the display panel to display the current frame to be displayed. The second driving voltage V2 is greater than the first driving voltage V1 and less than the third driving voltage V3. Compared to a scenario where the display panel only has the third driving voltage V3 and the first driving voltage V1, the introduction of the intermediate value, the second driving voltage V2, reduces the voltage difference or grayscale difference that occurs when invoking different overdrive lookup tables at different positions during dynamic image transitions. In other words, the absolute value of (V2−V1) or (V3−V2) is less than the absolute value of (V3−V1). This reduction of the absolute value minimizes variations in brightness and darkness between different positions after using the overdrive lookup tables, thereby avoiding the issue of momentary watermarks or mura (uneven display).

In some embodiments, the first driving voltage V1 is a driving voltage that does not invoke the overdrive lookup table. The third driving voltage is a driving voltage that invokes the overdrive lookup table.

In some embodiments, the voltage values in the overdrive lookup table are initial voltage values. The second driving voltage V2 is a calibrated voltage value obtained by multiplying the initial voltage value from the overdrive voltage lookup table by K, where K is greater than 0 and less than 1.

Specifically, the second driving voltage V2 is the driving voltage obtained by invoking the overdrive lookup table with a factor k (k*overdrive lookup table), where K is greater than 0 and less than 1.

Specifically, the second driving voltage V2=K*initial voltage value (that is, the second driving voltage V2 equals K times the initial voltage value).

Specifically, the second driving voltage V2 equals K times the third driving voltage V3.

Specifically, when the grayscale difference ΔL is greater than or equal to the first preset grayscale threshold Gth1 and is less than or equal to the second preset grayscale threshold Gth2, the second driving voltage V2 is determined. In this case, the driving voltage of the overdrive lookup table is invoked to obtain the third driving voltage V3, and the third driving voltage V3 is multiplied by a coefficient K to obtain the second driving voltage V2. Alternatively, the second driving voltage V2 can be determined by directly multiplying the driving voltage from the overdrive lookup table by K.

It should be noted that the first driving voltage V1 is the initial driving voltage without compensation, the second driving voltage is the driving voltage compensated by invoking the overdrive lookup table with a factor k (k*overdrive lookup table), and the third driving voltage is the driving voltage compensated by invoking the overdrive lookup table.

In some embodiments, the first preset grayscale threshold Gth1 can be any integer from 3 to 8.

Specifically, the first preset grayscale threshold Gth1 can be any integer value among a grayscale of 3, 4, 5, 6, 7, or 8.

In some embodiments, the second preset grayscale threshold Gth2 can be any integer from 4 to 16.

Specifically, the second preset grayscale threshold Gth2 can take on any integer value among a grayscale of 4, 5, 6, 7, 8, 9, 10, 11, 12, 13, 14, 15, or 16, while also satisfying the condition that the second preset grayscale threshold Gth2 is greater than the first preset grayscale threshold Gth1.

In some embodiments, K is any one of 0.1, 0.2, 0.3, 0.4, 0.5, 0.6, 0.7, 0.8, or 0.9.

Specifically, K is any one of 0.1, 0.2, 0.3, 0.4, 0.5, 0.6, 0.7, 0.8, or 0.9, while satisfying the condition that the second driving voltage V2 is greater than the first driving voltage V1 and less than the third driving voltage V3.

Second Embodiment

The present embodiment further provides a display panel 100. The display panel 100 can be driven using any of the display panel driving methods in the above embodiments.

Figure 3:
FIG. 3 illustrates a display panel according to a second embodiment of the present application.

Please refer to FIG. 3, which illustrates a display panel 100 according to the second embodiment of the present application.

The present application further provides a display panel 100. The display panel 100 includes a storage module, an acquisition module, a determination module, and a control module.

The storage module stores an overdrive lookup table.

The acquisition module is used to obtain a first grayscale of a current frame to be displayed and a second grayscale of a previous frame of the current frame to be displayed, for at least a portion of positions on the display panel.

The determinization module is used to determine whether to call the overdrive lookup table to determine a driving voltage according to a grayscale difference between the first grayscale and the second grayscale.

The control module is used to determine the driving voltage based on a result from the determination module, to drive the display panel for displaying the current frame to be displayed. In this regard, the step of determining the driving voltage based on the result from the determination module for driving the display panel to display the current frame to be displayed includes: When the grayscale difference is less than a first preset grayscale threshold, driving the display panel to display the current frame to be displayed with a first driving voltage; when the grayscale difference is greater than or equal to the first preset grayscale threshold and less than or equal to a second preset grayscale threshold, driving the display panel to display the current frame to be displayed with a second driving voltage; when the grayscale difference is greater than the second preset grayscale threshold, calling the overdrive lookup table to determine a third driving voltage and driving the display panel to display the current frame to be displayed with the third driving voltage. In this context, the second driving voltage is greater than the first driving voltage and less than the third driving voltage, and the second preset grayscale threshold is greater than the first grayscale threshold.

Specifically, the storage module, the acquisition module, the determination module, and the control module can be a certain functional element or function in a driving chip, or/and a circuit board, or/and a driver. For example, the storage module, the acquisition module, the determination module, and the control module can be registers responsible for their respective functions in a driving chip, or/and a circuit board, or/and a driver.

Specifically, the control module is used to determine the driving voltage based on a result from the determination module, to drive the display panel for displaying the current frame to be displayed. In this regard, the step of determining the driving voltage based on the result from the determination module for driving the display panel to display the current frame to be displayed includes: S310: When the grayscale difference ΔL is less than a first preset grayscale threshold Gth1, driving the display panel to display the current frame to be displayed with a first driving voltage V1. S320: When the grayscale difference ΔL is greater than or equal to the first preset grayscale threshold Gth1 and is less than or equal to a second preset grayscale threshold Gth2, driving the display panel to display the current frame to be displayed with a second driving voltage V2. S330: When the grayscale difference ΔL is greater than the second preset grayscale threshold Gth2, calling the overdrive lookup table to determine a third driving voltage V3 and driving the display panel to display the current frame to be displayed with the third driving voltage V3. In this context, the second driving voltage V2 is greater than the first driving voltage V1 and less than the third driving voltage V3, and the second preset grayscale threshold Gth2 is greater than the first grayscale threshold Gth1.

In some embodiments, the first driving voltage V1 is a driving voltage that does not invoke the overdrive lookup table. The third driving voltage is a driving voltage that invokes the overdrive lookup table.

In some embodiments, the voltage values in the overdrive lookup table are initial voltage values. The second driving voltage V2 is a calibrated voltage value obtained by multiplying the initial voltage value from the overdrive voltage lookup table by K, where K is greater than 0 and less than 1.

Specifically, the second driving voltage V2 is the driving voltage obtained by invoking the overdrive lookup table with a factor k (k*overdrive lookup table), where K is greater than 0 and less than 1.

In some embodiments, the first preset grayscale threshold Gth1 can be any integer from 3 to 8. The second preset grayscale threshold Gth2 can be any integer from 4 to 16, and is the driving voltage obtained by invoking the overdrive lookup table with a factor k (k*overdrive lookup table).

The corresponding parts, functions, steps, effects, etc. of this embodiment are the same as those of the first embodiment, and a detailed description is not repeated here.

The above description provides a detailed introduction to the display panel and the driving method of the display panel presented in this application. Specific examples are used in this disclosure to explain the principles and implementation of this application. The explanation of the above embodiments is only intended to assist in understanding the method and its core ideas of the present application. At the same time, for those skilled in the art, there may be variations in specific implementation methods and application scope based on the ideas presented in this application. In conclusion, the content of this specification should not be understood as limiting the scope of this application.

What is claimed is:

1. A driving method of a display panel, comprising the following steps:

obtaining a first grayscale of a current frame to be displayed and a second grayscale of a previous frame of the current frame to be displayed, for at least a portion of positions of the display panel;

providing an overdrive lookup table; and determining whether to call the overdrive lookup table to determine a driving voltage according to a grayscale difference between the first grayscale and the second grayscale, in order to drive the display panel to display the current frame to be displayed, wherein the step of determining whether to call the overdrive lookup table to determine the driving voltage according to the grayscale difference between the first grayscale and the second grayscale in order to drive the display panel to display the current frame to be displayed comprises:

when the grayscale difference is less than a first preset grayscale threshold, driving the display panel to display the current frame to be displayed with a first driving voltage;

when the grayscale difference is greater than or equal to the first preset grayscale threshold and is less than or equal to a second preset grayscale threshold, driving the display panel to display the current frame to be displayed with a second driving voltage; and when the grayscale difference is greater than the second preset grayscale threshold, calling the overdrive lookup table to determine a third driving voltage and driving the display panel to display the current frame to be displayed with the third driving voltage, wherein the second driving voltage is greater than the first driving voltage and less than the third driving voltage, and the second preset grayscale threshold is greater than the first grayscale threshold.

2. The driving method of the display panel as claimed in claim 1, wherein the first driving voltage is a driving voltage independent of calling the overdrive lookup table, and the third driving voltage is a driving voltage that is obtained from calling the overdrive lookup table.

3. The driving method of the display panel as claimed in claim 2, wherein voltage values in the overdrive lookup table are initial voltage values, and the second driving voltage is a calibrated voltage value obtained by multiplying the initial voltage value from the overdrive voltage lookup table by K, wherein K is greater than 0 and less than 1.

4. The driving method of the display panel as claimed in claim 1, wherein the first preset grayscale threshold is any integer from 3 to 8.

5. The driving method of the display panel as claimed in claim 1, wherein the second preset grayscale threshold is any integer from 4 to 16.

6. The driving method of the display panel as claimed in claim 3, wherein K is any one of 0.1, 0.2, 0.3, 0.4, 0.5, 0.6, 0.7, 0.8, or 0.9.

* * * * *